United States Patent [19]

Lee

[11] Patent Number: 5,453,827

[45] Date of Patent: Sep. 26, 1995

[54] FIBEROPTIC IN-LINE FILTER AND TECHNIQUE FOR MEASURING THE TRANSMISSION QUALITY OF AN OPTICAL FIBER THROUGH THE USE OF A FIBEROPTIC IN-LINE FILTER

[75] Inventor: Ho-Shang Lee, El Sobrante, Calif.

[73] Assignee: Dicon Fiberoptics, Berkeley, Calif.

[21] Appl. No.: 21,790

[22] Filed: Feb. 24, 1993

[51] Int. Cl.$^6$ .................. G01N 21/00; H01J 5/16; H01J 40/14
[52] U.S. Cl. .................. 356/73.1; 250/227.11; 250/227.15; 250/227.18
[58] Field of Search ........... 356/73.1; 250/227.11, 250/227.15, 227.16, 227.18

[56] References Cited

U.S. PATENT DOCUMENTS

| | | | |
|---|---|---|---|
| 4,838,690 | 6/1989 | Buckland et al. | 356/73.1 |
| 4,878,731 | 11/1989 | Caron et al. | 350/96.21 |
| 4,989,942 | 2/1991 | Koenigsberg et al. | 350/96.8 |
| 5,077,813 | 12/1991 | Dorsel et al. | 385/19 |
| 5,104,391 | 4/1992 | Ingle et al. | 356/73.1 |
| 5,177,348 | 1/1993 | Laor | 356/73.1 |
| 5,177,354 | 1/1993 | Tomita et al. | 356/73.1 |
| 5,181,264 | 1/1993 | Chiaretti et al. | 385/33 |
| 5,268,741 | 12/1993 | Chou et al. | 356/73.1 |
| 5,270,537 | 12/1993 | Jacobs | 356/73.1 |
| 5,280,335 | 1/1994 | Needham | 356/73.1 |
| 5,282,017 | 1/1994 | Kasindorf et al. | 356/73.1 |

FOREIGN PATENT DOCUMENTS 3232445  1/1984  Germany .

OTHER PUBLICATIONS

Technical Note, "Specifying Fiber Optic Couplers," Gould Electronics, pp. 1–7.

"Interference Filters," Oriel Corporation, CT, U.S.A., pp. 16–19.

SELFOC Product Guide, NSG America, Icn., Somerset, N.J.

Stone et al., "Narrow–Band FiEnd Etalon Filters Using Expanded–Core Fibers," *IEEE, Journal of Lightwave Technology*, vol. 10, No. 12, pp. 1851–1854 (Dec. 1992).

Reay, "Tunable filters for dense wavelength division multiple access systems," *Optical Engineering*, vol. 31, No. 8, pp. 1671–1675 (Aug. 1992).

Kobrinski et al., "Wavelength–Tunable Optical Filters: Applications and Technologies," *IEEE Communications Magazine*, pp. 53–63 (Oct. 1989).

*Primary Examiner*—Robert P. Limanek
*Assistant Examiner*—David Ostrowski
*Attorney, Agent, or Firm*—Majestic, Parsons, Siebert & Hsue

[57] ABSTRACT

A technique for determining the existence and location of faults within an optical fiber is disclosed. The technique is accomplished through the use of fault detecting means such as an optical time domain reflectometer used in conjunction with an in-line optical filtering device which filters out selected wavelengths of optical radiation within an optical fiber. Specifically, the filtering device comprises two GRIN lenses placed along the optical path of the fiber such that light within the fiber is collimated by the first GRIN lens, and returned to the fiber by the second GRIN lens. The means of wavelength selection is achieved by an optical filter coating on the surface of at least of the GRIN lenses. The optical filter can be an edge pass filter, a band-pass filter, or an absorption filter. The invention provides for a broadband wavelength selection, which is not achieved by fused biconic type wavelength division multiplexers.

30 Claims, 5 Drawing Sheets

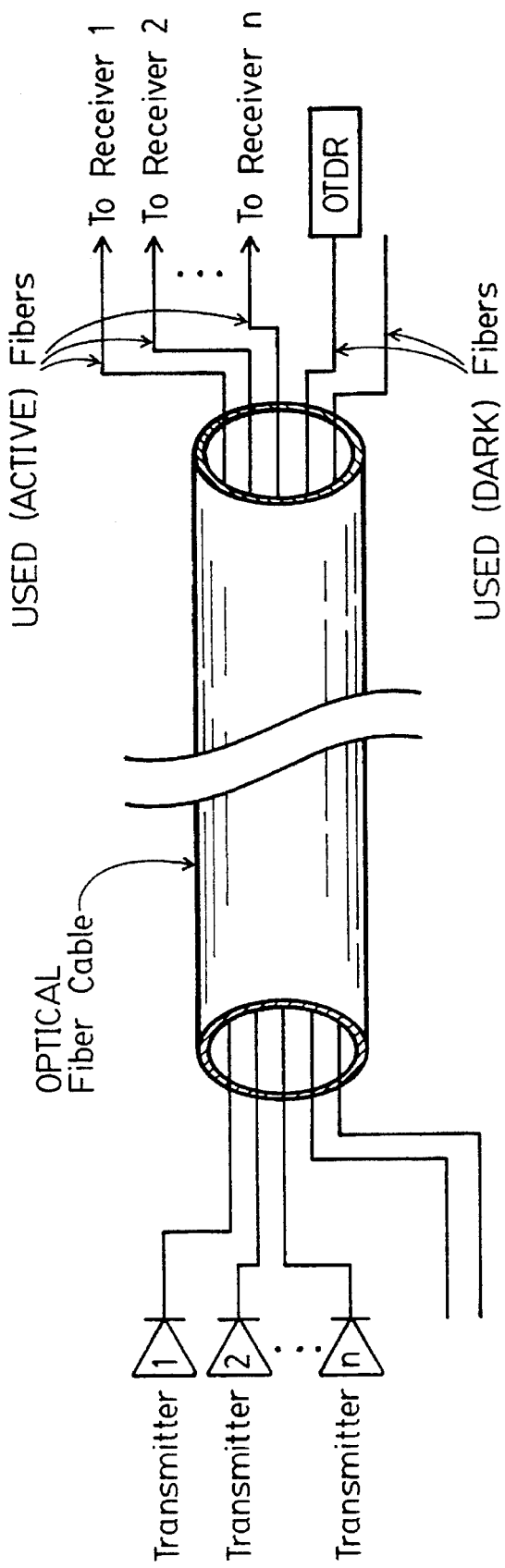
FIG._1.
PRIOR ART

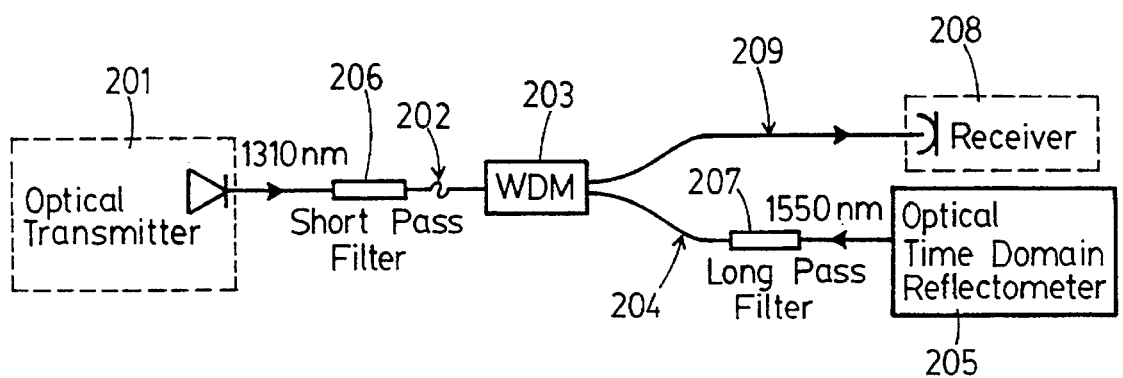
FIG._2a.
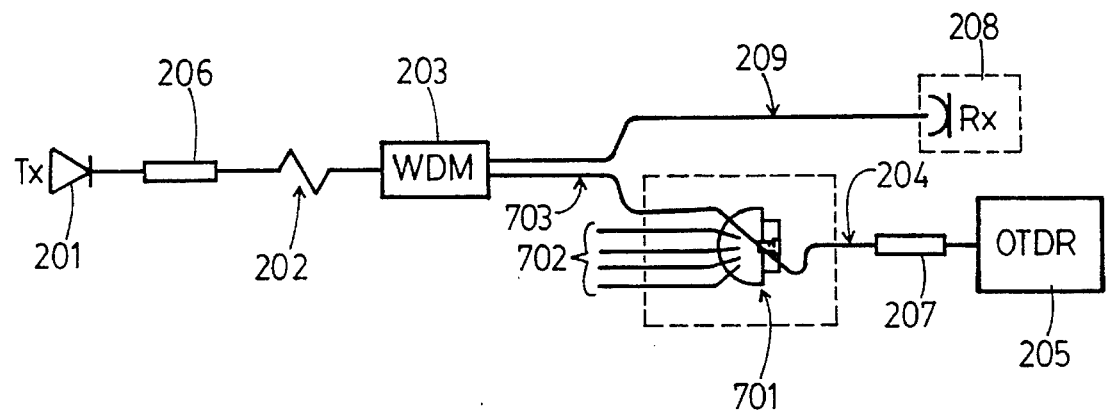
FIG._2b.

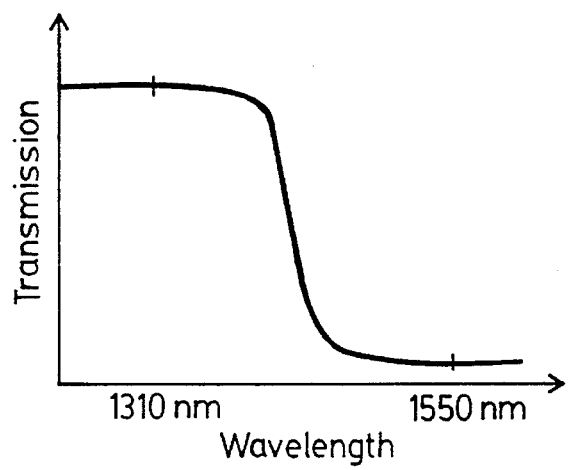
FIG._3a.
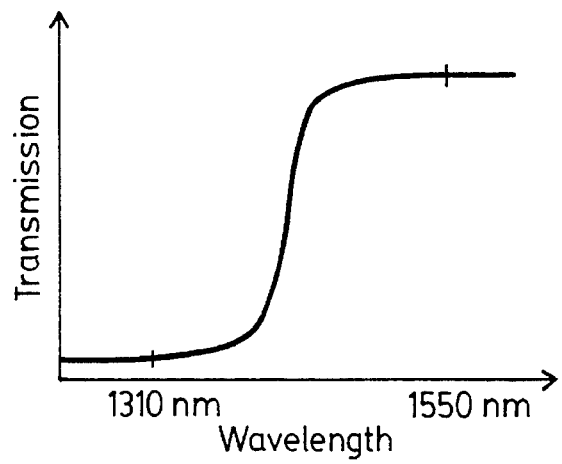
FIG._3b.
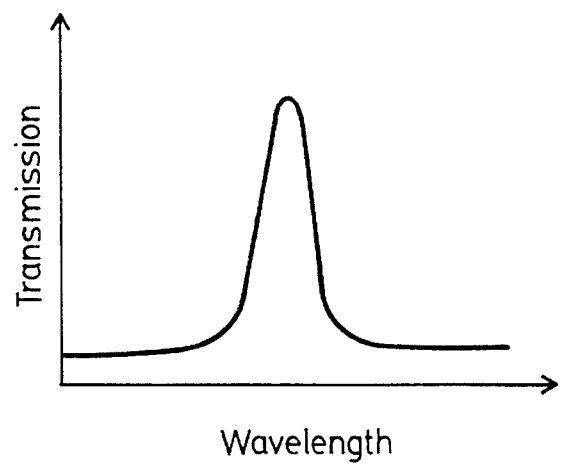
FIG._3c.

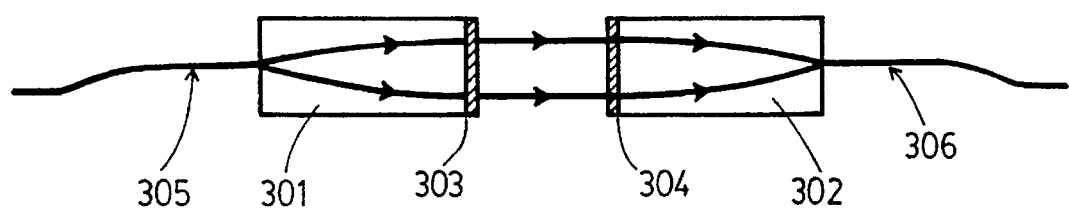
FIG._4.
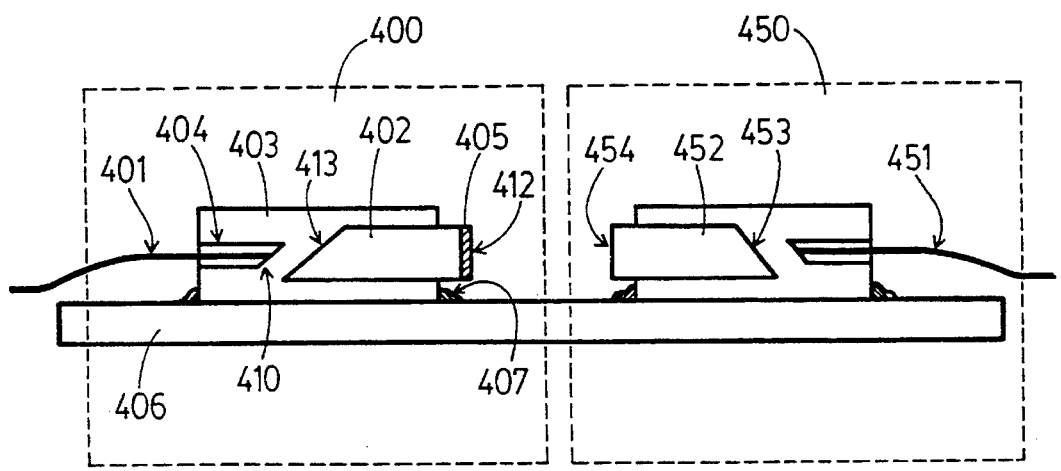
FIG._5a.
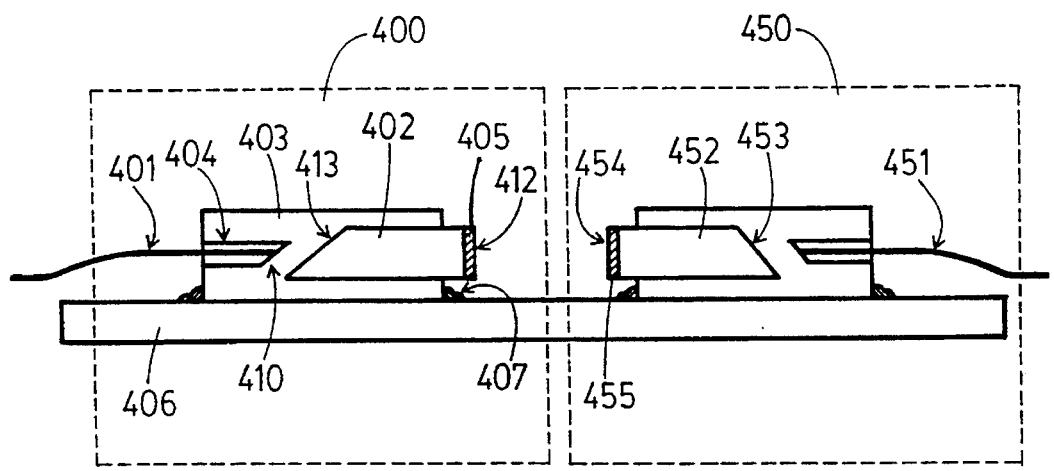
FIG._5b.

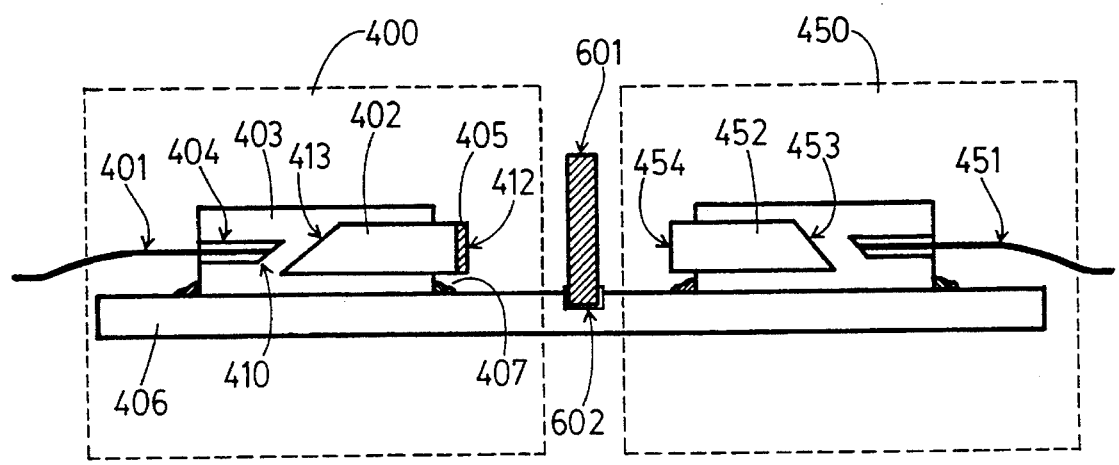
FIG._5c.

FIBEROPTIC IN-LINE FILTER AND TECHNIQUE FOR MEASURING THE TRANSMISSION QUALITY OF AN OPTICAL FIBER THROUGH THE USE OF A FIBEROPTIC IN-LINE FILTER

FIELD OF THE INVENTION

The present invention relates generally to devices for testing the transmission quality of optical fibers, and more particularly to a technique for determining the existence and location of faults within an optical fiber.

BACKGROUND OF THE INVENTION

In recent years, fiberoptic cables have replaced traditional copper wire as the preferred medium for telecommunications. Although optical fibers have certain advantages over copper wire, they are still subject to faults which may result during installation of the fibers or from environmental factors after installation. Thus, as the complexity of the telecommunication fiber network increases, the fiberoptic cables used within this network need to be constantly monitored to insure their performance and transmission quality.

One device which has established itself as a versatile instrument for monitoring the performance of fiberoptic cables is the optical time domain reflectometer, commonly referred to as an "OTDR." The time domain reflectometer makes use of the fact that microscopic fluctuations of the refractive index and small flaws in the optical fiber cause light to be reflected. In its simplest construction, an OTDR includes a light source, such as a pulse laser diode, for introducing a test pulse of light into the fiber under test (FUT), a photodetector for detecting the intensity of signals reflected back to the OTDR, and a timing device for measuring the elapsed times between introducing the test pulse and receiving the reflected signals.

When a test pulse of light is introduced into a FUT, the signal travels down the length of the fiber and runs into faults and imperfections along the way. This in turn causes the test pulse to be backscattered and reflected within the fiber core. These backscattered and reflected signals travel back down the FUT in the direction of the OTDR and are sensed by the photodetector. The trace signals of the backscattering and reflections provide clues as to the existence and location of faults within the FUT.

Backscattered signals (also known as Rayleigh scattering) are typically weak, and are due to refractive-index fluctuations and inhomogeneities in the fiber core. A backscattered signal may be used to detect faults such as micro-bends or splice losses, and to measure overall attenuation of light signals transmitted through the optical fiber. Reflective signals (also known as Fresnel reflections) are due to discontinuities in the fiber. A reflective signal may be used to determine the overall length of the fiber line, and to detect breaks in the fiber, reflective connectors, and splices of fiber having different indices of refractions. The operation and use of an OTDR to monitor the transmission quality of an optical fiber cable is generally known to those skilled in the art, and therefore need not be discussed further.

Most conventional techniques employing the use of an OTDR to monitor the transmission quality of an optical fiber cable utilize a technique known as "dark fiber monitoring." Such a technique is illustrated in FIG. 1 of the drawings of the present application. As can be seen in FIG. 1, an optical fiber cable includes a plurality of optical fibers, each of which can be used for an independent purpose. Most of the optical fibers within the cable are used to carry an optical signal from an optical transmitter to a respective receiver. The fibers which are used to carry this optical signal are called "active" fibers. The unused fibers within the cable are called "inactive" or "dark" fibers. The technique of dark fiber monitoring consists of optically connecting an OTDR to one end of an inactive or dark fiber which is part of the optical fiber cable to be monitored. Once the OTDR is connected to the dark fiber, a short test pulse light is introduced into the optical fiber by the OTDR, and travels the length of the fiber. When the test pulse light reaches a fault within the fiber, part of the test pulse is reflected back to the OTDR. When the OTDR detects this reflected signal, it records the intensity and time of arrival of the signal. The OTDR repeats this process for every reflected signal which is detected. A comparison of the relative intensity of the reflected signals is then used to determine the transmission quality of the cable. A reflected signal of relatively high intensity is typically generated from a fault within the fiber, whereas a reflected signal of relatively low intensity is typically generated from Rayleigh scattering.

Once it has been determined that a fault exists within the optical fiber, its location can be precisely determined by the equation $F=(c/2n)t$, where c is the velocity of light, n is the maximum value of the refractive-index of the fiber core, and t is the elapsed time measured from the time of departure of the initial test pulse to the time of arrival of the reflected signal.

Although dark fiber monitoring is useful for detecting the existence and location faults within an optical fiber cable, the technique itself has a number of limitations. By far one of the biggest limitations of dark fiber monitoring is that the technique can only be used to detect faults located within the unused optical fiber of the fiber cable which is being tested; the technique cannot be used to detect faults which exist solely within one or more of the active fibers within the optical fiber cable. Thus, when the entire optical fiber cable has been damaged, such as at a particular location, dark fiber monitoring is a useful technique to pinpoint the location of the damaged part of the fiber cable. However, if only part of the optical fiber cable is damaged, whereby faults are created only within a portion of the active fibers and not in the dark fibers of the fiber cable, dark fiber monitoring will not be useful for determining the location of the faults within the damaged active fibers. This is because the technique of dark fiber monitoring does not monitor the transmission quality of an active optical fiber; it only monitors the transmission quality of the unused or dark optical fibers within the fiber cable.

Because of the limitations associated with dark fiber monitoring, new techniques have been developed wherein the transmission quality of the active optical fiber itself is monitored. This technique is referred to as "active fiber monitoring." The basic principle behind active fiber monitoring is similar to that of dark fiber monitoring with the exception that the fault locating device is optically coupled directly to an active optical fiber using an optical coupling device such as a wavelength division multiplexer (WDM). However, as with dark fiber monitoring, there are several problems associated with conventional techniques of active fiber monitoring. First, any test light pulse introduced by an OTDR into an active optical fiber will destabilize the respective optical transmitter of that optical system. This occurs as a result of either the test pulse or reflections of the test pulse entering the optical transmitter. Second, light signals sent by the optical transmitter through the FUT will be detected by the OTDR and thereby degrade the accuracy of the OTDR measurement. Third, some of the reflected signals of the OTDR's test pulse will be received by the respective optical receiver of that optical system, thereby increasing the bit error rate of that receiver.

Thus, the monitoring of the transmission quality of optical fibers using dark fiber monitoring and active fiber monitoring have not proved to be as effective as desired. It is therefore an objective of the present invention to provide a technique for actively monitoring the transmission quality of an optical fiber which overcomes the aforementioned limitations.

SUMMARY OF THE INVENTION

This and additional objectives are accomplished by the various aspects of the present invention, wherein, briefly, according to a principal aspect, at least one optical in-line filter is used to filter out a specific set of wavelengths of optical radiation located within an optical fiber system which is being monitored for transmission quality. By inserting several optical in-line filters at various locations within the fiberoptic system, it is then possible to monitor the transmission quality of the active optical fiber without encountering any of the aforementioned problems associated with conventional active fiber monitoring techniques.

To implement a principal aspect of the present invention, a new in-line optical filtering device has been designed which incorporates the use of a first and second collimating means for collimating optical radiation, a first filter means for filtering out specific wavelengths of optical radiation, and a supporting means for positioning the collimating means in substantial axial alignment. The first and second collimating means are preferably two gradient index lenses, or GRIN lenses positioned adjacent to each other. In a preferred embodiment, bonded to at least one end of at least one of the GRIN lenses is a multilayer thin film optical filter coating which selectively transmits or rejects optical radiation depending on its wavelength. Light which enters into the first GRIN lens is collimated into a parallel beam, and then is passed preferably at right angles through the multilayer filter coating at the end of the GRIN lens. The filtered parallel light then enters the second GRIN lens whereupon the filtered light is then focused into a conical beam and is passed into the other end of the optical fiber. This second GRIN lens may also have a multi-layer filtering element bonded to its end in order to filter the same or additional wavelengths out of the previously filtered light passing through it. When used in this fashion, the two modified GRIN lenses can function together to form either a short pass optical filter, wherein all wavelengths of light above a specified wavelength are excluded; a long pass optical filter, wherein all wavelengths of light below a specified wavelength are excluded; a band pass optical filter, wherein only a specified set of wavelengths are transmitted through the optical filter; or an absorption filter, wherein only a specified set of wavelengths are excluded from passing through the optical filter.

This new in-line optical filter using GRIN lenses has several advantages over conventional optical filters which bond a filtering device directly onto the optical fiber. First the optical coating on the surface of the GRIN lens is more durable and easier to apply than that on the fiber end because the size of the GRIN lens is significantly larger than that of the optical fiber. Second, the expanded collimated beam is less sensitive to misalignment of the optical beams being passed from one optical fiber to another. Third, the two GRIN lenses forming an interface between two optical filters are positioned to allow for the insertion of an additional optical filtering element without sacrificing insertion loss between the fibers. Fourth, the collimated beam of the present filter incidents the optical filter coating in a uniform direction such that the efficiency of wavelength exclusion is higher than that of an aperture beam such as that exiting from an optical fiber end.

Another aspect of the present invention is directed to a fault locating apparatus for determining the existence and location of faults within a first optical fiber of an optical system. The apparatus comprises an optical fiber fault locating means, such as an OTDR, which is optically coupled to the first optical fiber via a second optical fiber connected to an optical coupling device, such as a WDM. The apparatus further comprises a first and second filter means for filtering out optical radiation within the optical system. Both the first and second filter means may preferably comprise the newly designed optical in-line filter discussed above. The first filter means is inserted into the first optical fiber at a point near the optical transmitter, and is designed to prevent the test light pulse from the OTDR from entering into the optical transmitter. The second filter means is inserted into the second optical fiber at a point near the OTDR, and filters out all wavelengths of light generated by the optical transmitter before that light reaches the OTDR. The system described immediately above can be modified to determine the existence and location of faults within a selected optical fiber of one of a plurality of optical systems by incorporating the use of a multichannel optical switching device which connects each of the plurality of optical systems to the OTDR.

Another aspect of the present invention is directed to a method for determining the existence and location of faults within a first optical fiber or a plurality of optical fibers. The method comprises the steps of introducing a test pulse light by an OTDR into an optical system wherein the wavelength of the test pulse light differs from a communication light transmitted by the optical receiver; filtering out the test pulse light from the fiber under test using a first optical filter; filtering out the communication light from the optical fiber connected to the OTDR using a second optical filter; receiving a plurality of reflected test pulse lights into the OTDR; measuring the detected intensity and time of arrival of the plurality of reflected test pulse lights; and determining the existence and location of faults within the fiber under test based upon the relative intensity and time of arrival of each reflected signal.

Additional objects, features and advantages of the various aspects of the present invention will become apparent from the following description of its preferred embodiment, which description should be taken in conjunction with the accompanying drawings.

BRIEF DESCRIPTION OF THE DRAWINGS

FIG. 1 is an illustration of the conventional technique of dark fiber monitoring.

FIG. 2A is an illustration of the technique of active fiber monitoring constructed in accordance with the present invention and executed upon a single optical system.

FIG. 2B is an illustration of the technique of active fiber monitoring constructed in accordance with the present invention, and executed upon a selected optical fiber of a plurality of optical systems.

FIG. 3A is an illustration of the transmission characteristics of short pass edge optical filter as a function of wavelength.

FIG. 3B is an illustration of the transmission characteristics of a long pass edge optical filter as a function of wavelength.

FIG. 3C is an illustration of the transmission characteristics of a band pass edge optical filter as a function of wavelength.

FIG. 4 is a depiction of an optical beam being passed from one optical fiber through a set of GRIN lenses, each comprising an optical filter coating, to a second optical fiber.

FIG. 5A is a cross-sectional view of a first preferred embodiment of a newly designed in-line optical filter constructed in accordance with the present invention.

FIG. 5B is a cross-sectional view of a second preferred embodiment of a newly designed in-line optical filter constructed in accordance with the present invention.

FIG. 5C is a cross-sectional view of a third preferred embodiment of a newly designed in-line optical filter constructed in accordance with the present invention.

DESCRIPTION OF THE PREFERRED EMBODIMENT

FIG. 2 illustrates the technique of active fiber monitoring constructed in accordance with the present invention. Communication signals are transmitted by an optical transmitter 201 at a particular wavelength, such as 1310 nm, into an optical fiber 202. The fiber 202 is used to carry the communications signal from the optical transmitter 201 to the optical receiver 208. This fiber 202 typically has a length of several kilometers, and is therefore susceptible to damage at any number of locations along its length. In order to detect faults which occur within the fiber 202, an optical time domain reflectometer (OTDR) 205 is optically coupled to the fiber cable 202 via an optical coupling device 203 connected to a second fiber cable 204. The optical coupling device 203 depicted in FIG. 2A is a wavelength division multiplexer (WDM). By using a WDM device, it is possible to simultaneously transmit two or more wavelengths of light in the same optical fiber 202. The first wavelength of light is the communication signal produced by the optical transmitter 201. The second wavelength of light, hereinafter referred to as a test pulse light, is produced by the OTDR 205, and has a wavelength different from that of the communication signal, such as 1550 nm. The wavelengths given for the communication signal (1310 nm) and the test pulse light (1550 nm) are only examples. Other wavelengths may be used for these respective signals so long as each signal uses a wavelength which is different from the other.

The WDM device 203 of FIG. 2A functions both as a multiplexer and a demultiplexer of differing wavelengths of optical radiation. As a multiplexer, the WDM device 203 combines the test pulse light generated by the OTDR 205 into the fiber 202 which is already carrying the communication signal generated by the optical transmitter 201. The result is a simultaneous transmission of two optical signals of differing wavelengths within the optical fiber 202. These two signals are further travelling in opposite directions. The communication signal is travelling from the optical transmitter 201 towards the WDM device 203, and the test pulse light is travelling from the WDM device 203 towards the optical transmitter 201.

A problems occurs, however, when this test pulse light reaches the optical transmitter 201 since the optical transmitter 201 can be destablized by a small amount of optical radiation entering it. For this reason, a short pass edge optical filter 206 is inserted in line with the optical path of fiber 202 near the optical transmitter 201. The transmission characteristics of the short pass edge filter 206 are illustrated in FIG. 3A. As depicted in FIG. 3A, a short pass edge filter can filter out wavelengths of optical radiation which are greater than a specified wavelength. The short pass filter 206 of FIG. 2A favors the passage of the communication signal (1310 nm), and prevents the passage of the test pulse light (1550 nm) from entering to the optical transmitter 201. In a preferred embodiment, the short pass filter 206 comprises the elements depicted in FIG. 5A of the present invention, which is discussed in greater detail below.

The purpose of introducing a test pulse light into the optical fiber 202 is to locate faults within that fiber. As discussed above, when the test pulse light crosses a fault within the fiber 202, some of that light is reflected back in the direction of the OTDR 205. When this happens, both the communication signal and the reflected test pulse light travel in the same direction towards the WDM device 203. When these two signals of differing wavelengths (1550 nm and 1310 nm) enter the WDM device 203, they are demultiplexed by the WDM device 203, and each signal leaves the WDM device 203 on a separate output fiber. The communication signal, having a wavelength of 1310 nm, enters the optical fiber 209 and travels towards the optical receiver 208. The reflected test pulse light signal, having a wavelength of 1550 nm, enters the optical fiber 204, and travels towards the OTDR 205. Unfortunately, however, the WDM device 203 is not able to completely isolate the two demultiplexed wavelengths. Currently available optical isolators using fused WDM devices provide about −20 dB of isolation between the two demultiplexed wavelengths which are within the respective operating bandwidth of the WDM, typically 10 nm. If the two demultiplexed wavelengths are outside their respective operating bandwidth of the WDM, the crosstalk as well as the insertion loss increases.

Because the optical transmitter 201 and the OTDR 205 both use a laser diode to generate their respective signals, the center wavelength of each of these two signals practically variates, typically ±20 nm among laser diodes. In addition, the spectrum bandwidth of the laser diode also variates, typically 20 nm. As a result, each of the signals generated by the optical transmitter 201 and the OTDR 205 are partially outside the operating bandwidth of the WDM such that a small amount of crosstalk will be present within each of the optical fibers 204 and 209. Thus, fiber 204 will contain not only the reflected test pulse signals, but also will contain a crosstalk communication signal (on the order of −20 dB) originally generated by the optical transmitter 201. This weakened communication signal degrades the measurement accuracy of the OTDR. Therefore the present invention provides a long pass edge optical filter 207 positioned in-line with the optical path of the fiber 204 and near the OTDR 205. The transmission characteristics of the long pass edge filter 207 of FIG. 2A is depicted in FIG. 3B. As shown in FIG. 3B, the long pass edge optical filter allows for the transmission of wavelengths greater than that of a specified wavelength and excludes the transmission of wavelengths less than that of the specific wavelength. Using this long pass edge filter 207, it is then possible to filter out the crosstalk communication signal contained within the optical fiber 204 before that signal reaches the OTDR 205, thereby assuring the accuracy measurement of the OTDR 205.

Although not depicted in FIG. 2A, it is also possible to insert a filtering device in-line with the optical path of fiber 209 in order to filter out the crosstalk signal within fiber 209 attributed to the reflected test pulse signals before these signals reach the optical receiver 208. Without such a filtering device, the weakened reflected test pulse signals within fiber 209 would interfere with the operation of the optical receiver 209, thereby increasing the bit error rate of the optical receiver 208. In addition, although FIG. 2A has been depicted as including a short pass filter 206 and a long pass filter 207, it should be understood that any filtering device may be used so long as that filtering device allows for the transmission of a desired wavelength or set of wavelengths and allows for the exclusion of an undesired wavelength or set of wavelengths. For example such a filtering device may be a band pass optical filter, the transmission characteristics of which are illustrated in FIG. 3C. As can be seen in FIG. 3C, the band pass filter allows for the transmission of a narrow band of wavelengths through the filter; all other wavelengths are excluded. In a preferred embodiment, each of the filtering devices depicted in FIG. 2A and discussed immediately above incorporate the newly designed in-line optical filter of the present invention as depicted in FIG. 5A. The filtering device depicted in FIG. 5A and its variations depicted in FIGS. 5B and 5C are discussed in greater detail below.

FIG. 2B is a depiction of a second preferred embodiment incorporating the active fiber monitoring technique depicted in FIG. 2A, and executed upon a selected optical fiber 202 of a plurality of optical systems represented by the plurality of optical fibers 702. Each of the plurality of optical systems comprises an optical transmitter 201, an optical fiber to be tested 202, a WDM device 203, an optical receiver 208, and a filtering device 206 for filtering out the wavelength of the test pulse light generated by the OTDR 205. Each of the plurality of optical fibers 702 is connected to a respective WDM device in the same manner that the optical fiber 703 is connected to the WDM device 203 of the optical system comprising the optical transmitter 201. The function of the multi-channel optical switch 701 is to optically connect the OTDR 205 to a selected optical system via the plurality of optical fibers 702, including fiber 703. Through this configuration, it is possible to actively monitor and test the transmission quality of a selected optical fiber from the plurality of optical systems connected to the multi-channel optical switch 701 by attuning the optical switch 701 to that particular selected optical system, thereby optically connecting the OTDR to that particular optical fiber. Thus, when a problem occurs within a particular optical system of said plurality of optical systems, the multi-channel optical switch 701 selects the optical fiber which is connected to that particular optical system which requires testing, thereby optically connecting the OTDR to that system. Once the OTDR is optically coupled to the particular optical system which requires monitoring, the technique of active fiber monitoring can be implemented in the same manner as described in FIG. 2A.

FIG. 5A is a cross-sectional view of the filtering device which is depicted in FIGS. 2A and 2B as items 206 and 207. The filtering device of FIG. 5A provides for a broad wavelength selection in an active fiber optic transmission line by introducing a filtering element between two collimated fiber optic beams. The collimating of the fiber optic beam is accomplished by the use of a gradient index lens (GRIN). The GRIN lens is available from Nippon Sheet Glass under the trade name SELFOC. The GRIN lens is a rod shaped lens with a refractive index profile in a direction perpendicular to the optical axis. Preferably, the refractive index profile is a parabolic distribution with the maximum distribution in the center. For this type of lens, the gradient index material refracts the light continuously. This is illustrated in FIG. 4. When an appropriate length of GRIN lens is chosen, for example a quarter pitch, the conical beam exiting the fiber and 305 is expanded and collimated to a parallel beam by a first GRIN lens 301. When the expanded parallel beam exits the first GRIN lens 301, it passes through a filtering element 303 which is designed to filter out a specific set of wavelengths from the collimated beam. The collimated beam then passes through a second filtering element 304 and enters a second GRIN lens 302, whereby the collimated beam is then focused into a conical beam and enters the fiber 306. The filter elements 303 and 304 are each comprised of a multi-layered optical filter coating designed to exclude a specific set of wavelengths of optical radiation.

There are numerous advantages for using GRIN lenses in combination with optical filter coatings to form an in-line optical filter in accordance with the present invention. First, the optical coating on the surface of a GRIN lens is more durable and easier to apply than that on the end of an optical fiber because the size of the GRIN lens is significantly larger than the surface of the optical fiber. Second the expanded collimated beam is less sensitive to misalignment of optical beams passing from one fiber to another, and practically allows a sufficient axial gap for inserting an additional optical filtering element between the two GRIN lenses without incurring or suffering significant insertion loss. Third, the collimated beam incidents the optical coating in a uniform (parallel) direction. This means that the collimated beam passes perpendicularly or nearly perpendicularly through the filter coating of each of the GRIN lenses, thereby increasing the efficiency of wavelength selection compared to that of an aperture beam exiting from a fiber end and passing through a similar filter coating.

FIG. 5A is a cross-sectional view of one version of the preferred embodiment of the filtering device of FIG. 4. In FIG. 5A lens assemblies 400 and 450 define a pair of collimated fiber optic beam assemblies. Fiber 401 is first glued to the inner hole of a capillary tube 404. The fiber end 410 (and consequently the capillary end) is then polished to form an angle of other than 90 degrees. The angled fiber end 410 can reduce the Fresnel back-reflection in the glass-air interface. The capillary tube 404 with the fiber 401 in it is then inserted and bonded to a sleeve 403. A GRIN lens 402 is coated on one end 412 with a filter coating 405 and on the other end 413 with either an anti-reflection coating or another filter coating. The filter coating 405 can be a short pass edge filter (FIG. 3A), a long pass edge filter (FIG. 3B), a band pass filter (FIG. 3C), or an absorption filter. Edge filters transmit only above or below an "edge" or "cutoff" wavelength. They provide very sharp transition at the edge between the pass and reject regions. Band pass filters transmit light only within restricted and often narrow bandwidth regions. Absorption filters transmit all wavelengths of light except for a selected, usually narrow, set of undesired wavelengths. The process of applying optical filter coatings to lenses is generally known to those skilled in relevant art, and therefore need not be discussed further.

The lens end 412 is preferably flat and the other lens end 413 is preferably angled to be parallel or nearly parallel with the end of the optical fiber 410. The angled end can reduce back-reflection returning into the optical fiber 401. The coated GRIN lens 402 is then inserted and bonded to the sleeve 403. When positioning the GRIN lens 402, the end of the GRIN lens 413 may either be placed directly in contact with the fiber end 410, or may be placed such that there is a small gap of air between the end of the GRIN lens 413 and the fiber end 410. The lens assembly 400 is then either attached to the support structure 406 using adhesive or welding material 407. The support structure 406 serves to align the two GRIN lens assemblies 400 and 450 such that they are in substantial axial alignment with each other.

The other lens assembly 450 is identical to the lens assembly 400, with the exception that the end of the GRIN lens 454 does not contain a filter coating. The reason this filter coating has been omitted in lens assembly 450 is because the light passing through lens assembly 400 has already been filtered to exclude the undesired wavelengths of optical radiation. To obtain optimal optical coupling between the two lens assemblies 400 and 450, lens assembly 450 is optically aligned to the lens assembly 400 and is then fixed to the base 406 by adhesive or welding material 407.

FIG. 5B is a cross-sectional view of a second version of the preferred embodiment of the present invention. FIG. 5B is identical to that of FIG. 5A with the exception that the end of the GRIN lens 454 now contains a filter coating 455. This filter coating 455 may be identical to the filter coating 405 of lens assembly 400, or may be different. Where the filter coatings 455 and 405 are identical, this aids in the exclusion of undesired wavelengths passing through the lens assemblies 400 and 450, and increases the wavelength isolation performance of the filtering device. Where the filter coatings 405 and 454 are different, each filter coating may exclude a particular set of undesired wavelengths. In such a situation, for example, the filtering device of FIG. 5B could function as a band pass filter.

FIG. 5C is a cross-sectional view of a third version of the preferred embodiment of the present invention. The lens assemblies 400 and 450 are identical to those described in FIG. 5A, with the exception that optical coating 405 can either be a filtering coating, or an anti-reflection coating to reduce the back-reflection as well as insertion loss. Applying a filtering coating can give additional wavelength selection, and furthermore increases the wavelength isolation performance of the filtering device. The lens assemblies 400 and 450 are first fixed to the base 206 in substantial axial alignment. An optical filter 601 is then mounted to the base 406 parallel to or angled to the GRIN lens and surface 412. To further secure the optical filter 601, a slot 602 is made within the base 406. The optical filter 601 can be either a short pass edge filter, a long pass edge filter, a band pass filter, or an absorption filter.

The descriptions of the various preferred embodiments of this invention are given for purposes of explaining the principles thereof, and are not to be considered as limiting or restricting the invention since many modifications may be made by the exercise of skill in the art without departing from the scope of the invention.

It is claimed:

1. An optical device for filtering out specified wavelengths of optical radiation being passed from a first optical fiber having a first end to a second optical fiber having a second end, wherein said device is located between said first and second optical fibers, and wherein said device comprises:

a first collimating means for collimating optical radiation;

a second collimating means for collimating optical radiation being spaced apart from said first collimating means by a gap, wherein at least one of said first and second collimating means comprises first filter means for filtering out a first set of predetermined and unchanging wavelengths of optical radiation passing through said at least one collimating means; and means for supporting said first and said second collimating means, said first and second optical fibers being respectively positioned adjacent to said first and second collimating means such that light being passed from said first optical fiber to said second optical fiber is forced to pass through said first collimating means, through said first filter means, and through said second collimating means.

2. The device of claim 1 wherein said filter means comprises at least one layer of a thin film device which selectively rejects or transmits optical radiation depending on its wavelength.

3. The device of claim 1 wherein said first and said second collimating means are GRIN lenses.

4. The device of claim 1 wherein the central axis of said first optical fiber forms a first angle with respect to a first plane created by the surface of said first end;

the central axis of said second optical fiber forms a second angle with respect to a second plane created by the surface of said second end; and wherein said first and second angles are other than 90 degrees.

5. The device of claim 4 wherein:

the surface of said first collimating means positioned adjacent to said first optical fiber forms a plane which is substantially parallel to said first plane; and wherein the surface of said second collimating means positioned adjacent to said second optical fiber forms a plane which is substantially parallel to said second plane.

6. The device of claim 1 wherein said first collimating means comprises said first filter means, and second collimating means comprises a second filter means for filtering out a second set of predetermined and unchanging wavelengths of optical radiation passing through said second collimating means, and wherein the light being passed from said first optical fiber to said second optical fiber is further forced to pass through said second filter means.

7. The device of claim 6 wherein said first set of predetermined wavelengths and said second set of predetermined wavelengths are identical.

8. The device of claim 6 wherein said first set of predetermined wavelengths and said second set of predetermined wavelengths are not identical.

9. The device in accordance with claim 6 wherein said first and said second collimating means function together to form either a short pass optical filter, a long pass optical filter, or a band pass optical filter depending upon the predetermined wavelengths of optical radiation for which the first and second filter means have been designed to selectively filter out.

10. An optical transmission loss locating apparatus for determining the existence and location of optical transmission loss areas within a first optical fiber connected between an optical coupling device and an optical system comprising an optical transmitter, wherein said apparatus is optically coupled to said first optical fiber via said optical coupling device, said apparatus comprising:

a second optical fiber connected to said optical coupling device;

optical fiber transmission loss locating means connected to said second optical fiber for determining the existence and location of optical transmission loss areas within said first optical fiber;

first filter means connected to said first optical fiber for filtering out a first set of specific wavelengths of optical radiation from said first optical fiber, wherein said first filter means is located between said optical transmitter and said coupling device; and second filter means connected to said second optical fiber for filtering out a second set of specific wavelengths of optical radiation from said second optical fiber, wherein said second filter means is located between said transmission loss locating means and said coupling device.

11. The apparatus of claim 10 wherein each of said first and second filter means comprises collimating means for collimating optical radiation.

12. The apparatus of claim 11 wherein said collimating means is a GRIN lens.

13. The apparatus of claim 10 wherein said transmission loss locating means comprises means for introducing a test pulse light into said first optical fiber, and wherein the wavelength of said test pulse light differs from that of a communication light used for transmitting data within said first fiber.

14. The apparatus of claim 13 wherein said first set of specific wavelengths includes the wavelength of said test pulse light and does not include the wavelength of said communication light.

15. The apparatus of claim 13 wherein said second set of specific wavelengths includes the wavelength of said communication light and does not include the wavelength of said test pulse light.

16. The apparatus of claim 13 wherein said introducing means introduces said test pulse light towards said optical transmitter.

17. The apparatus of claim 10 wherein said transmission loss locating means is an optical time domain reflectometer.

18. An optical transmission loss locating apparatus for determining the existence and location of optical transmission loss areas within a plurality of optical fibers, each of said plurality of fibers being connected between a corresponding optical coupling device and a corresponding optical transmitter, wherein said apparatus is optically coupled to a selected optical fiber of said plurality of optical fibers via a multi-channel optical switch connected to said corresponding coupling device, said apparatus comprising:

a second optical fiber connected to said multi-channel optical switch;

optical fiber transmission loss locating means connected to said second optical fiber for determining the existence and location of optical transmission loss areas within said selected fiber;

a plurality of first filter means connected to each of said plurality of optical fibers for filtering out a first set of specific wavelengths of optical radiation from each of said plurality of optical fibers, wherein at least one of said plurality of first filter means is located between said corresponding coupling device and said corresponding optical transmitter; and second filter means connected to said second optical fiber for filtering out a second set of specific wavelengths of optical radiation from said second optical fiber, wherein said second filter means is located between said transmission loss locating means and said optical switch.

19. The apparatus of claim 18 wherein said second filter means and each of said plurality of first filter means comprises collimating means for collimating optical radiation.

20. The apparatus of claim 19 wherein said collimating means is a GRIN lens.

21. The apparatus of claim 18 wherein said transmission loss locating means comprises means for introducing a test pulse light into each of said plurality of optical fibers, and wherein the wavelength of said test pulse light differs from that of a communication light used for transmitting data within said plurality of fibers.

22. The apparatus of claim 21 wherein said first set of specific wavelengths includes the wavelength of said test pulse light and does not include the wavelength of said communication light.

23. The apparatus of claim 21 wherein said second set of specific wavelengths includes the wavelength of said communication light and does not include the wavelength of said test pulse light.

24. The apparatus of claim 21 wherein said introducing means introduces said test pulse light towards said corresponding optical transmitter.

25. A method for determining the existence and location of optical transmission loss areas within a first optical fiber connected between an optical coupling device and an optical system comprising an optical transmitter, wherein an optical fiber transmission loss locating device is optically coupled to said first optical fiber via a second optical fiber connected to said optical coupling device, said method comprising the steps of:

(a) introducing a test pulse light by said transmission loss locating device into said first optical fiber, wherein the wavelength of said test pulse light differs from that of a communication light used for transmitting data within said first fiber;

(b) filtering out said test pulse light from said first optical fiber using a first optical filter before said test pulse light reaches said optical transmitter;

(c) filtering out said communication light from said second optical fiber using a second optical filter before said communication light reaches said transmission loss locating device;

(d) receiving a plurality of backscattered signals into said transmission loss locating device;

(e) measuring the detected intensity and time of arrival of each of said plurality of backscattered signals; and (f) determining a loss of signal per unit length of fiber for every desired point along said first optical fiber based upon the relative intensity and time of arrival of each of said backscattered signals.

26. The method of claim 25 wherein the filtering steps of both (b) and (c) respectively include passing said test pulse light and said communication light through at least one GRIN lens.

27. The method of claim 25 wherein said introducing step introduces said test pulse light towards said optical transmitter.

28. A method for determining the existence and location of optical transmission loss areas within a selected fiber of a plurality of optical fibers, each of said plurality of fibers being connected between a corresponding optical coupling device and a corresponding optical transmitter, wherein an optical fiber transmission loss locating device is optically coupled to said plurality of fibers via a second optical fiber connected to a multi-channel optical switch, said method comprising the steps of:

(a) optically connecting to said second fiber a selected fiber from said plurality of fibers through the corresponding coupling device of said selected fiber and said switch;

(b) introducing a test pulse light by said transmission loss locating device into said selected fiber, wherein the wavelength of said test pulse light differs from that of a communication light used for transmitting data within said selected fiber;

(c) filtering out said test pulse light from said selected fiber using one of a plurality first optical filters before said test pulse light reaches said corresponding optical transmitter;

(d) filtering out said communication light from said second optical fiber using a second optical filter before said communication light reaches said transmission loss locating device;

(e) receiving a plurality of backscattered signals into said transmission loss locating device;

(f) measuring the detected intensity and time of arrival of each of said plurality of backscattered signals; and (g) determining a loss of signal per unit length of fiber for every desired point along said selected fiber based upon the relative intensity and time of arrival of each of said backscattered signals.

29. The method of claim 25 wherein said determining step (f) includes the step of determining the existence and location of faults within said first optical fiber.

30. The method of claim 28 wherein said determining step (g) includes the step of determining the existence and location of faults within said first optical fiber.

* * * * *